UNITED STATES PATENT OFFICE.

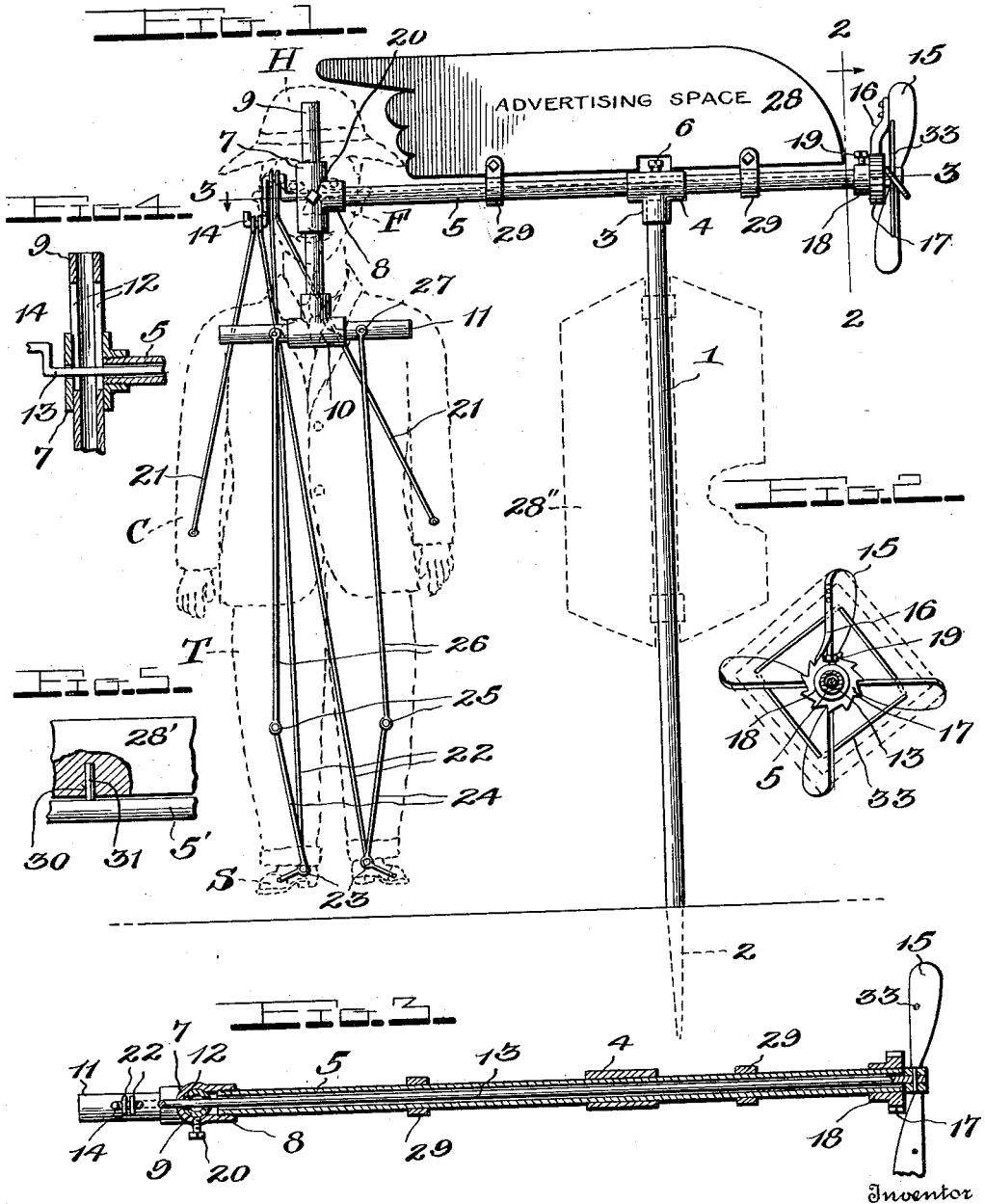

SAMUEL HUNTER, OF SYRACUSE, NEW YORK.

COMBINED SCARECROW AND ADVERTISING DEVICE.

1,142,326.  Specification of Letters Patent.  Patented June 8, 1915.

Application filed September 3, 1914. Serial No. 860,072.

*To all whom it may concern:*

Be it known that I, SAMUEL HUNTER, a citizen of the United States, residing at Syracuse, in the county of Onondaga and State of New York, have invented certain new and useful Improvements in Combined Scarecrows and Advertising Devices; and I do declare the following to be a full, clear, and exact description of the invention, such as will enable others skilled in the art to which it appertains to make and use the same.

My invention relates to improvements in devices for protecting sown or growing seed against being pulled by crows or the like.

The primary object of the invention is to provide a device of the character set forth having means whereby a number of garments may be suspended upon a weather vane whereby the same will be moved as the vane swings upon its pivot.

A secondary object is to provide means whereby the arms and legs of a suit of clothes suspended upon the vane, may be vibrated by the action of wind against a wind wheel.

A further object is to provide a sound producing device in connection with the above set forth features in order that a bird or animal's attention may be attracted to the device and likewise to attract passers' attention to one or more advertising panels placed upon the device.

Yet another object is to construct the entire device in the most simple manner consistent with its proper operation.

With the above objects in view, the invention resides in certain novel features of construction and combination herein described and claimed and shown in the drawings wherein:

Figure 1 is a side elevation of a device constructed in accordance with my invention; Fig. 2 is a detail vertical section taken on the line 2—2 of Fig. 1; Fig. 3 is a horizontal section taken on the line 3—3 of Fig. 1; Fig. 4 is a detail vertical section through a guide to be described and a portion of a standard which supports the garment hanger; and Fig. 5 is a side elevation partly in section, of a portion of the horizontal supporting bar and the advertising panel thereon, showing a slightly different form of construction from that illustrated in Fig. 1.

In the accompanying drawings, an upright standard 1 is shown whose lower end is preferably sharpened as indicated at 2 for insertion into the ground while its upper end loosely receives the upright portion 3 of a T-coupling whose horizontal portion or head 4 receives therein a hollow bar or pipe 5 which is thereby supported in a horizontal plane in such a manner as to allow the same to readily swing in a manner to become clear, a set screw 6 being preferably passed through the head 4 and bearing against the bar 5 whereby the latter may be adjusted within said head.

One end of the bar 5 carries a guide 7 which is here shown in the form of a T-coupling having its shank 8 mounted upon said bar while its head constitutes the guide and receives loosely an upright shank 9 whose lower end carries a T-coupling 10 supporting a transverse garment hanger 11 which like the shank 9, is preferably constructed of hollow piping or tubing. By reference more particularly to Fig. 4, it will be seen that the shank 9 is provided with alined slots 12 in opposite sides, said slots receiving one end of a driving shaft 13, said end being here shown as bent to form a double crank 14 while the opposite end of said shaft carries a wind wheel 15 which may be constructed of wood or metal and in any suitable manner, one of the blades of said wheel carrying a spring 16 whose inner end contacts with the teeth of a ratchet 17 whose hub 18 is rigidly yet removably secured upon the adjacent end of the bar 5 by a set screw 19 or other suitable fastening means. It will therefore be seen that as the wind wheel is rotated, the spring 16 will contact with the ratchet 17 thus producing a sound which will attract the attention of birds and animals.

By mounting the shank 9 in the above described manner and by providing a set screw 20 for the purpose of locking said shank in adjusted position, it will be readily seen that the garment hanger 11 may be raised or lowered to accommodate garments of different dimensions.

By reference to Fig. 1, it will be seen that a coat C, trousers T, shoes S, false face F, and hat H, are adapted to be supported by the hanger 11 and that a pair of operating wires or cords 21 are loosely connected one with one offset portion of the double crank 14 and with one of the sleeves of the coat C and the other wire with the other crank portion and with the other sleeve. It will further be noted that other operating elements 22 are connected one to the first mentioned offset portion of the double crank 14 and the other with the other offset and are pivotally united at 23 with a pair of bell-crank levers 24 whose horizontal arms extend outwardly into the shoes S while the upright arms rise within the legs of the trousers T and are pivoted at 25 to a pair of upright rods 26, whose upper ends are attached at 27 to the hanger 11. It will therefore be seen that as the wind wheel 15 rotates, producing the sound above mentioned, one arm of the coat C will be moved upwardly and downwardly and one of the shoes and lower portions of the trouser legs will likewise simultaneously move upwardly and downwardly thereby effectually representing the movements made by a person when walking.

Although the device would operate to equal advantage with the parts as above described, it becomes expedient to provide a panel 28 which is shown, in Fig. 1, as being removably secured upon the horizontal bar 5 by a pair of clips 29. This panel is designed primarily for the display of advertising matter, it being understood that the sound produced by the spring 16 against the ratchet 17 and the antics of the figure, will attract considerable attention to the device, thereby causing the same to be an effective advertising medium.

In Fig. 5, a panel 28' is provided in its lower edge with upright openings 30 which are adapted to receive a number of pins 31 rising from the horizontal bar 5' this being illustrative of one of a number of ways in which the panels may be removably secured upon the device. It will be readily seen that the pins could well be carried by the panels proper and have their ends inserted into openings in the bar 5'.

In connection with the above described mechanism, I may provide other advertising panels 28'' (illustrated in dotted lines in Fig. 1), said panels being preferably secured to the standard 1. I may likewise employ a number of elastic bands 32 which are illustrated in dotted lines upon the wind wheel or propeller in Fig. 2, said bands being stretched from one blade to another whereby a humming sound will be produced as the propeller is rotated. By reference to Fig. 2, it will likewise be seen that a bracing wire 33 is provided for the purpose of holding the blades of the propeller 15 against dislocation by centrifugal force.

I may here explain that in most cases, I do not intend to employ the shaft 13 and operating means connected thereto for imparting movement to the garments but that I merely intend to employ the garments themselves which may be suspended upon the hanger 11 in any suitable manner, the wind wheel 15, spring and ratchet 16 and 17 and one or more panels. It will be readily understood however, that the provision of the shaft 13 and its operating mechanism, lies clearly within the scope of the invention as claimed.

I have described my invention with considerable minuteness and have set forth its application to an upright standard, but I do not wish to be limited to details of construction, to the arrangement and proportioning of parts, to the character of materials employed or to the application of the invention, otherwise than as set forth in the appended claims.

Having thus described my invention, what I claim as new and desire to secure by Letters Patent is:—

1. A scare crow comprising a horizontal bar pivoted upon an upright axis, a vane thereon whereby the bar will be turned around its pivot by the wind, and a garment hanger carried by said bar.

2. A scare crow comprising a horizontal bar pivoted upon an upright axis, means on said bar for turning the same around its pivot when the wind blows, a garment hanger carried by said bar, and a wind operated sound producing instrument on said bar.

3. A scare crow comprising a horizontal bar pivoted upon an upright axis, an upright guide carried by said bar, an upright shank slidable in said guide, means for locking said shank against movement, a garment hanger carried by said shank, and means on the bar for turning the same around its pivot when the wind blows.

4. A scare crow comprising a garment hanger, a plurality of vibrating links depending therefrom, and means for vibrating said links, the latter being designed for attachment to garments hung upon the hanger.

5. A device for the purpose set forth comprising a horizontal bar pivoted on an upright axis, a garment hanger carried by said bar, a driven element likewise carried by said bar, a wind wheel for driving said element, and operating connections depending from said element and adapted to be attached to a number of garments to be suspended upon said hanger whereby said garments may be vibrated as the wind wheel is rotated.

6. A device for the purpose set forth comprising a hollow horizontal bar pivoted on an upright axis, a garment hanger carried by one end of said bar, a shaft passing through said bar, a crank on the end of the shaft adjacent the hanger, a wind wheel on the other end of said shaft, and operating elements depending from said crank and designed for attachment to a number of garments to be suspended from said hanger.

7. A device for the purpose set forth comprising a hollow horizontal bar pivoted upon an upright axis, a shaft passing through said bar, a garment hanger on one end of said bar, a ratchet secured on the other end thereof, means on the end of the shaft adjacent the hanger for vibrating a number of garments suspended from said hanger, and a spring on said wind wheel contacting with said ratchet.

8. A device for the purpose set forth comprising a weather vane, a pair of rods depending from a portion thereof, a pair of bell crank levers having the upper ends of their upright arms pivoted to said rods, operating connections pivoted to said bell crank levers intermediate their ends, a driven element loosely connected with said operating connections and means for driving said element whereby said bell cranks may be swung around their pivotal connections with said rods for the purpose set forth.

9. A device for the purpose set forth comprising a weather vane, a pair of rods depending therefrom, a pair of bell crank levers having their upright arms pivotally connected with said rods, substantially upright operating connections pivotally connected with said bell cranks intermediate their ends, said connections rising to a point adjacent the vane, a driven crank carried by said vane and loosely receiving portions of said operating connections, and means for driving the crank.

10. A device for the purpose set forth comprising an upright standard, a T-coupling having its shank revolubly mounted upon the upper end of the standard, a horizontal bar having its intermediate portion mounted in the head of said coupling, a vane secured to said bar, and a garment hanger likewise secured thereto for the purpose set forth.

In testimony whereof I have hereunto set my hand in presence of two subscribing witnesses.

SAMUEL HUNTER.

Witnesses:
LUTHER MANDEVILLE,
F. FORRESTER.

Copies of this patent may be obtained for five cents each, by addressing the "Commissioner of Patents, Washington, D. C."